US008142064B2

(12) United States Patent
Baek et al.

(10) Patent No.: US 8,142,064 B2
(45) Date of Patent: Mar. 27, 2012

(54) IMAGE DISPLAY APPARATUS

(75) Inventors: Jin Uk Baek, Daegu (KR); Seok Bong Han, Goomi-si (KR); Jong Man Park, Daegu (JP)

(73) Assignee: LG Electronics Inc., Seoul (KR)

( * ) Notice: Subject to any disclaimer, the term of this patent is extended or adjusted under 35 U.S.C. 154(b) by 505 days.

(21) Appl. No.: 12/227,014

(22) PCT Filed: Jul. 19, 2006

(86) PCT No.: PCT/KR2006/002822
§ 371 (c)(1),
(2), (4) Date: Jan. 30, 2009

(87) PCT Pub. No.: WO2007/117060
PCT Pub. Date: Oct. 18, 2007

(65) Prior Publication Data
US 2009/0154076 A1 Jun. 18, 2009

(30) Foreign Application Priority Data

Apr. 11, 2006 (KR) .................. 10-2006-0032792
Apr. 11, 2006 (KR) .................. 10-2006-0032793
Apr. 11, 2006 (KR) .................. 10-2006-0032794

(51) Int. Cl.
*F21V 7/04* (2006.01)
(52) U.S. Cl. .......... 362/634; 362/600; 362/632; 362/23; 362/26; 348/836

(58) Field of Classification Search ................... 362/257, 362/97.1–97.4, 600–634, 23–30; 348/836; 312/7.2
See application file for complete search history.

(56) References Cited

U.S. PATENT DOCUMENTS

| 4,626,965 | A  | * | 12/1986 | Gupta et al. ............. 362/33 |
| 5,088,680 | A  | * | 2/1992  | Farmer ................ 248/523 |
| 5,854,735 | A  | * | 12/1998 | Cheng ............... 361/679.07 |
| 6,024,335 | A  | * | 2/2000  | Min .................. 248/371 |
| 6,268,997 | B1 | * | 7/2001  | Hong ............... 361/679.07 |
| 6,366,453 | B1 | * | 4/2002  | Wang et al. .......... 361/679.06 |
| 6,637,104 | B1 | * | 10/2003 | Masuda et al. ............ 29/832 |
| 6,837,469 | B2 | * | 1/2005  | Wu et al. .............. 248/278.1 |
| 2005/0073517 | A1 |   | 4/2005  | Wu et al. |
| 2008/0019121 | A1 | * | 1/2008  | Ly .................. 362/145 |

FOREIGN PATENT DOCUMENTS

| JP | 11-259011 | 9/1999 |
| JP | 2003-022146 | 1/2003 |
| JP | 1020030056775 | 7/2003 |

OTHER PUBLICATIONS

International Search Report for International Application No. PCT/KR/2006/002822, Nov. 5, 2008.

* cited by examiner

*Primary Examiner* — Jason Moon Han
*Assistant Examiner* — Danielle Allen
(74) *Attorney, Agent, or Firm* — KED & Associates, LLP

(57) ABSTRACT

An image display apparatus includes a display for outputting an image, a supporting device supporting the display, the supporting device contacting directly on an installing surface and extending upward, the supporting device being provided with an inner hollow portion, and a light emission unit emitting light reflecting from the inner hollow portion.

24 Claims, 8 Drawing Sheets

[Fig. 1]
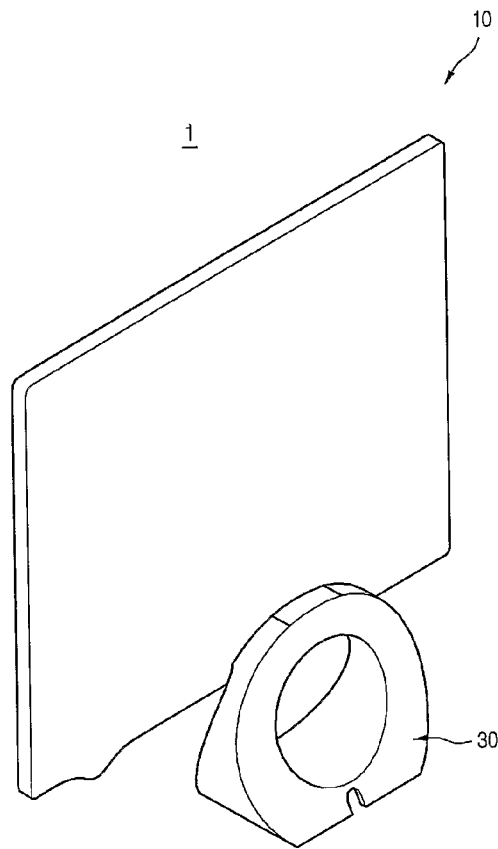
[Fig. 2]
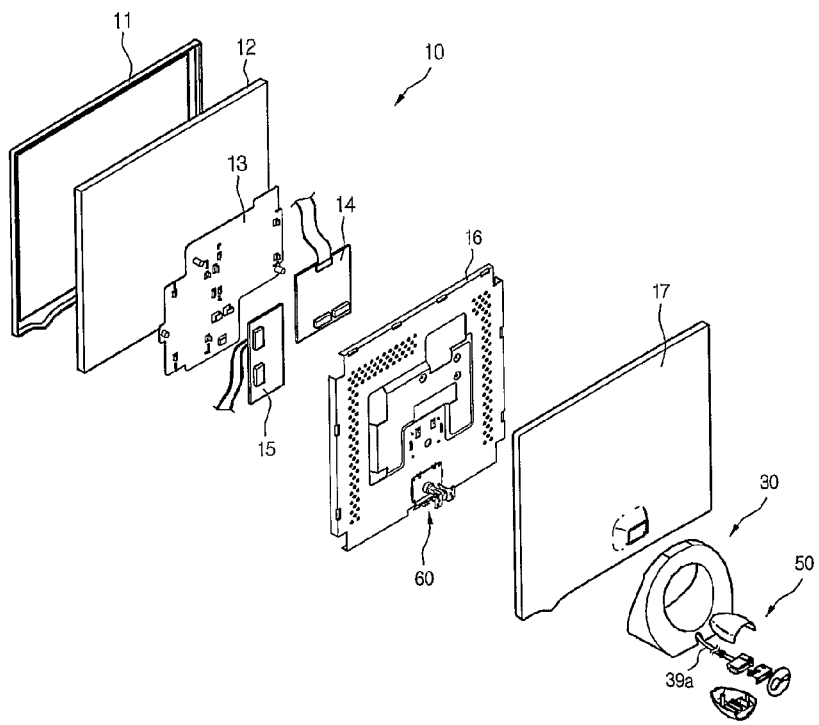

[Fig. 3]
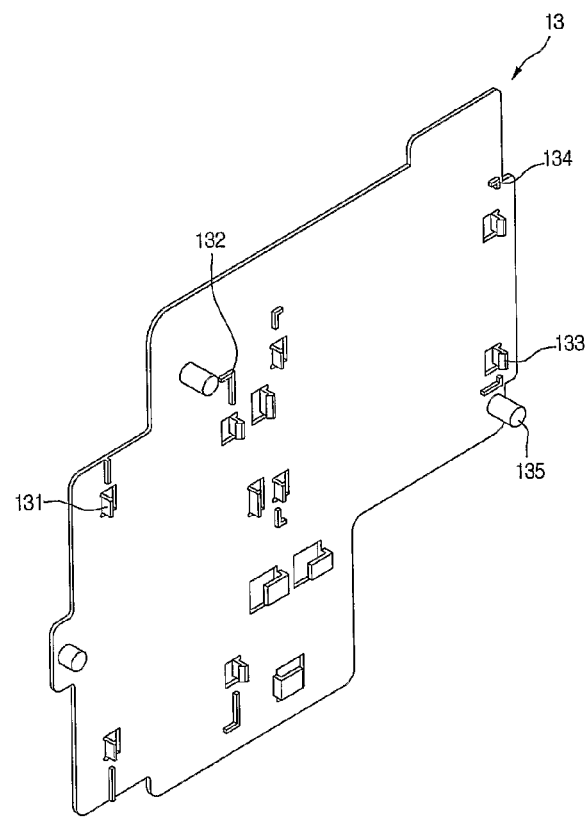
[Fig. 4]
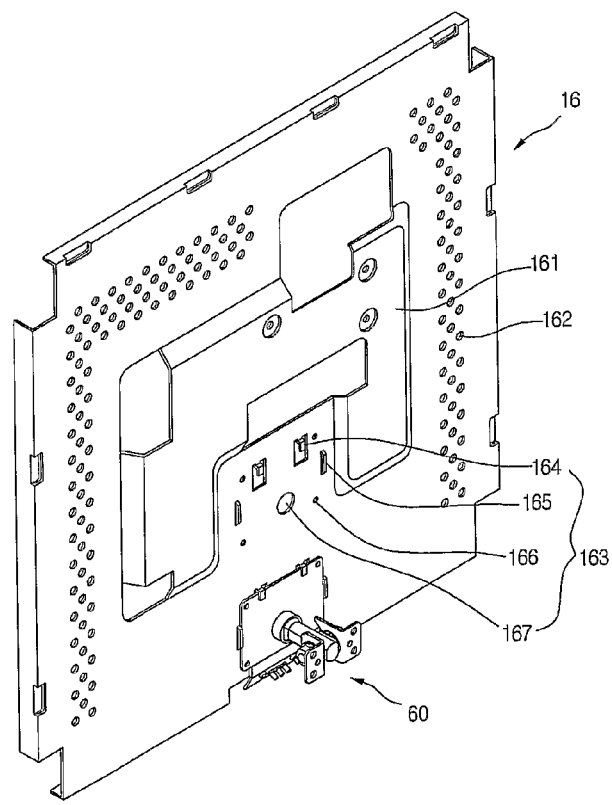

[Fig. 5]
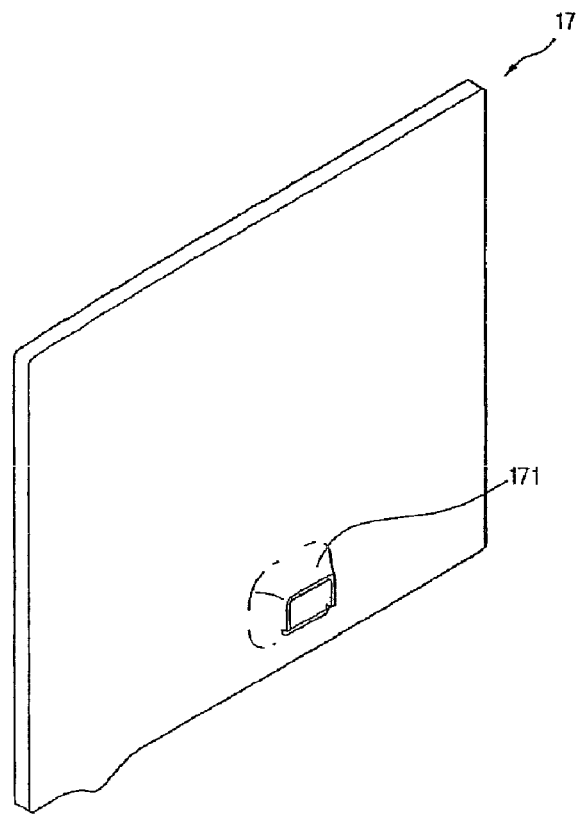
[Fig. 6]
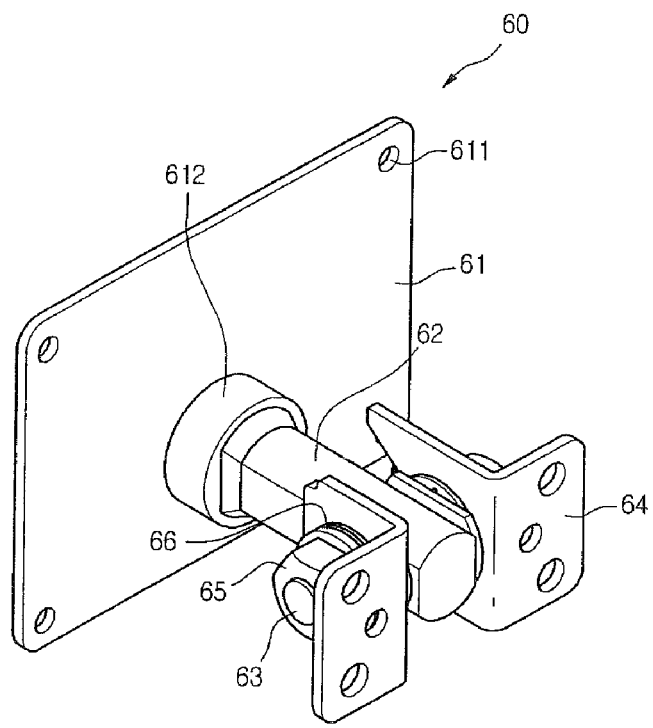

[Fig. 7]
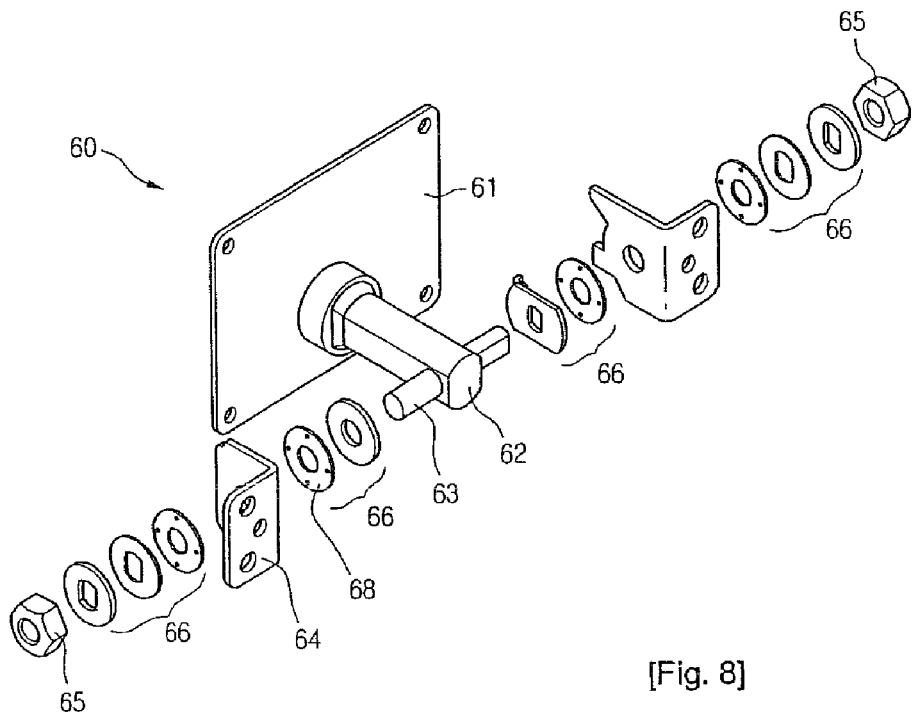
[Fig. 8]
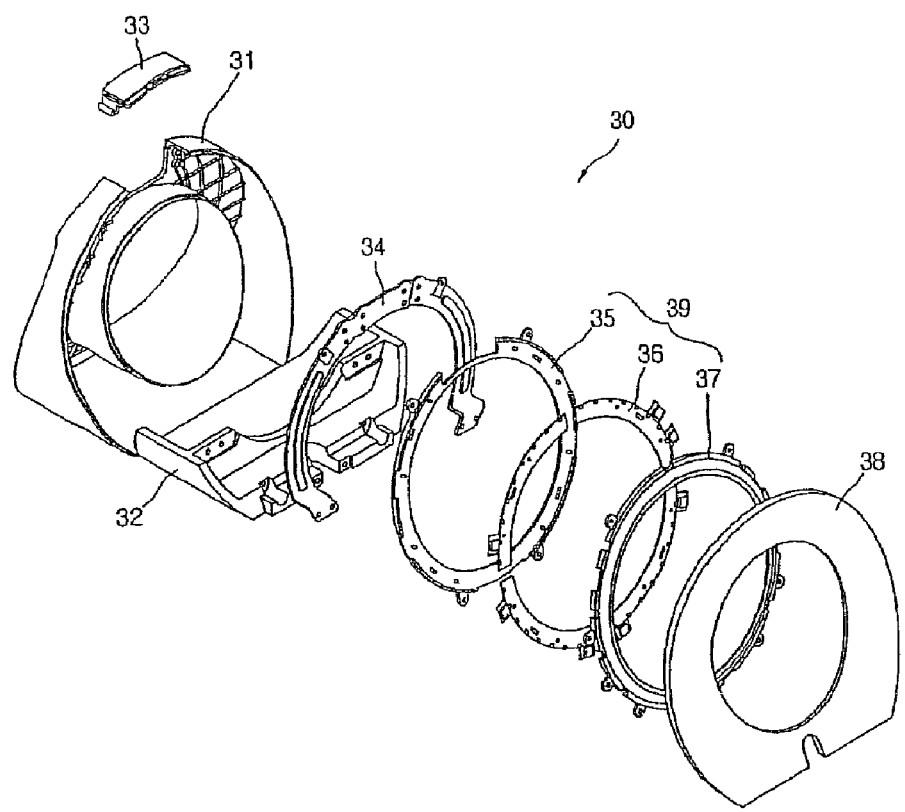

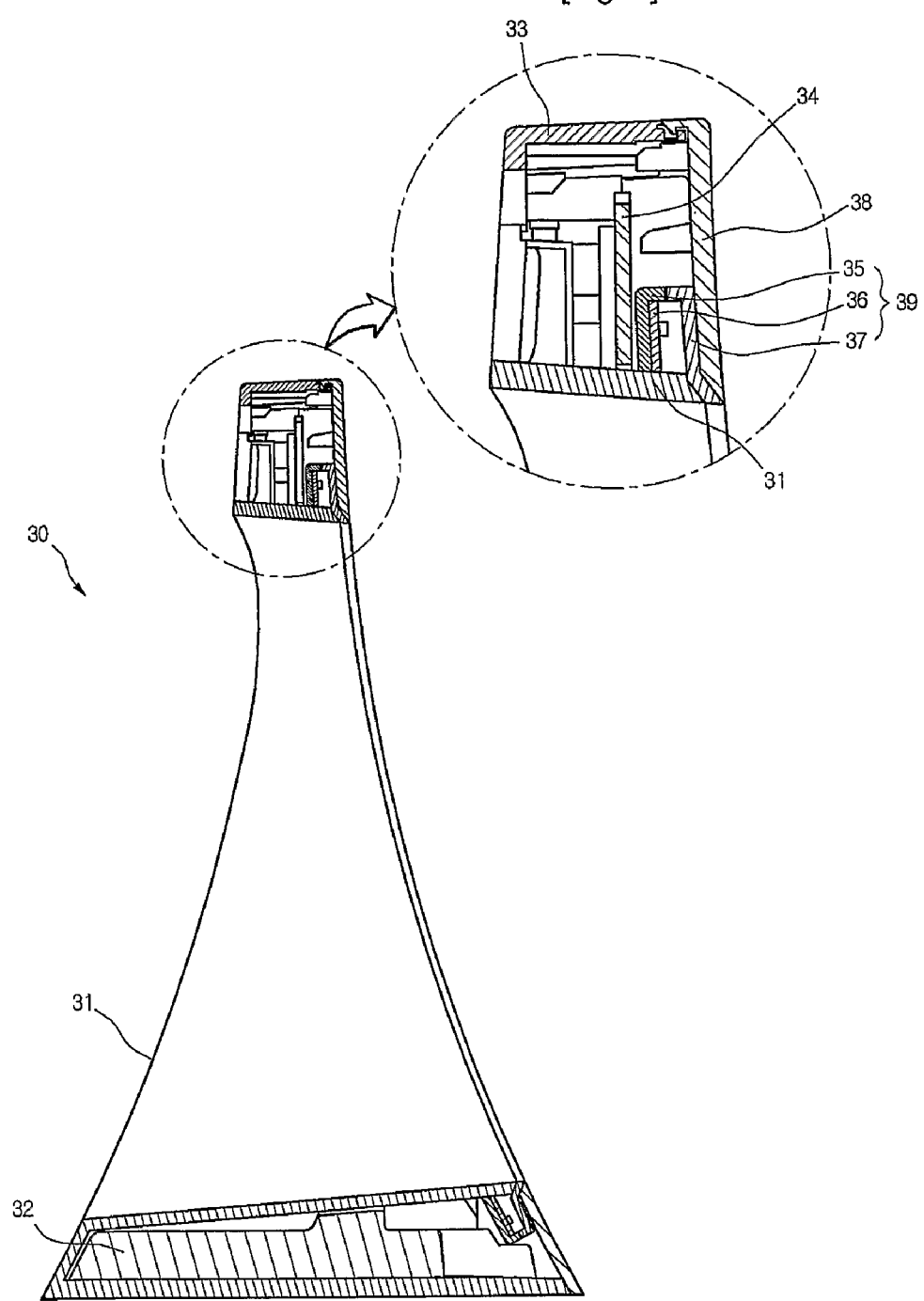
[Fig. 9]

[Fig. 10]
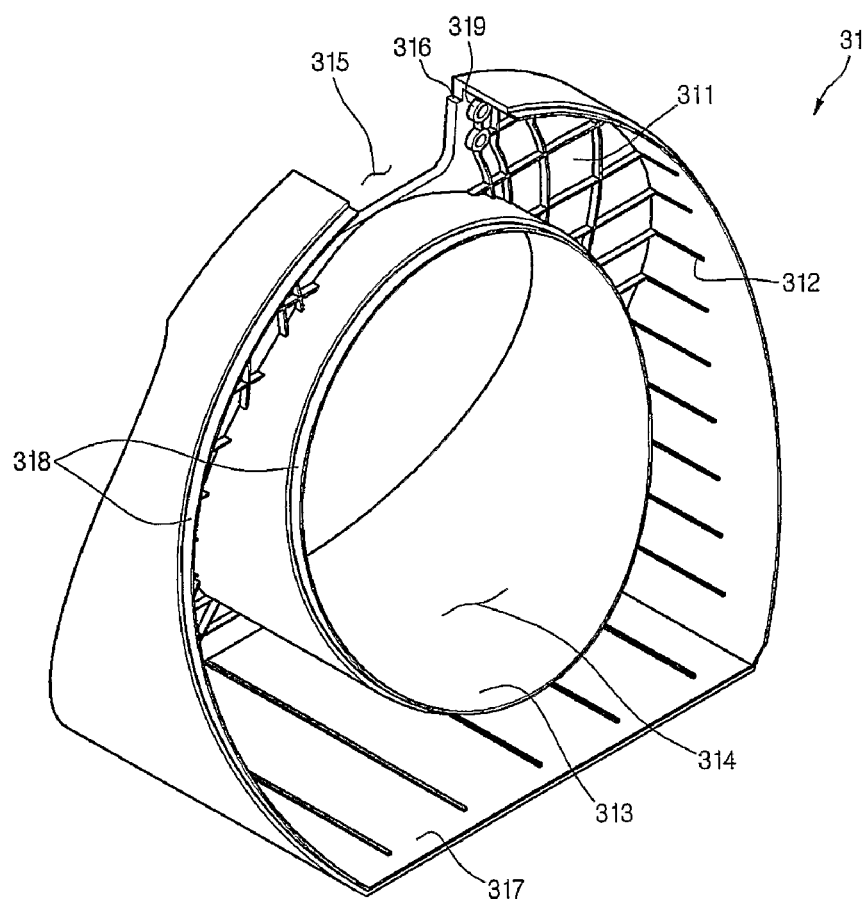
[Fig. 11]
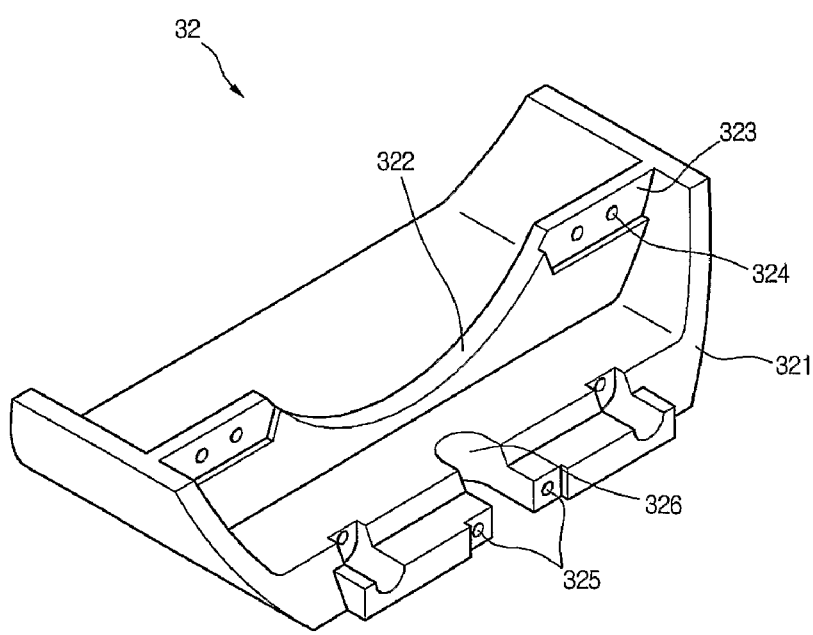

[Fig. 12]
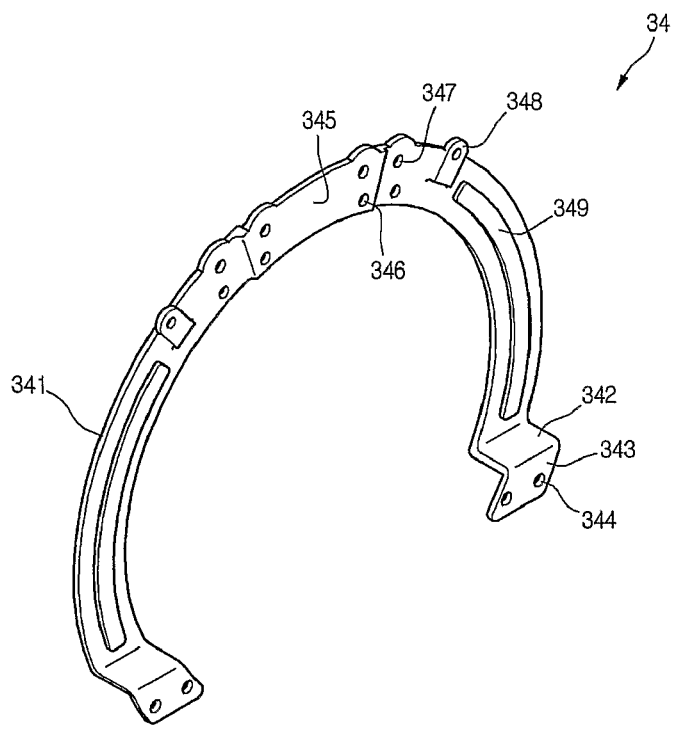
[Fig. 13]
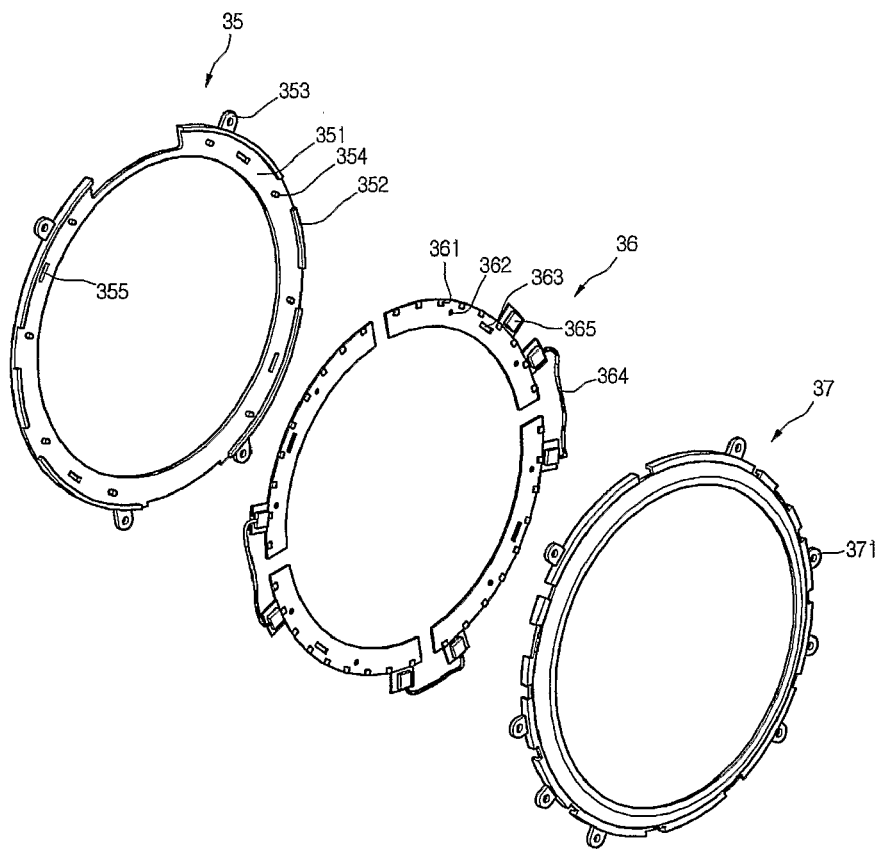

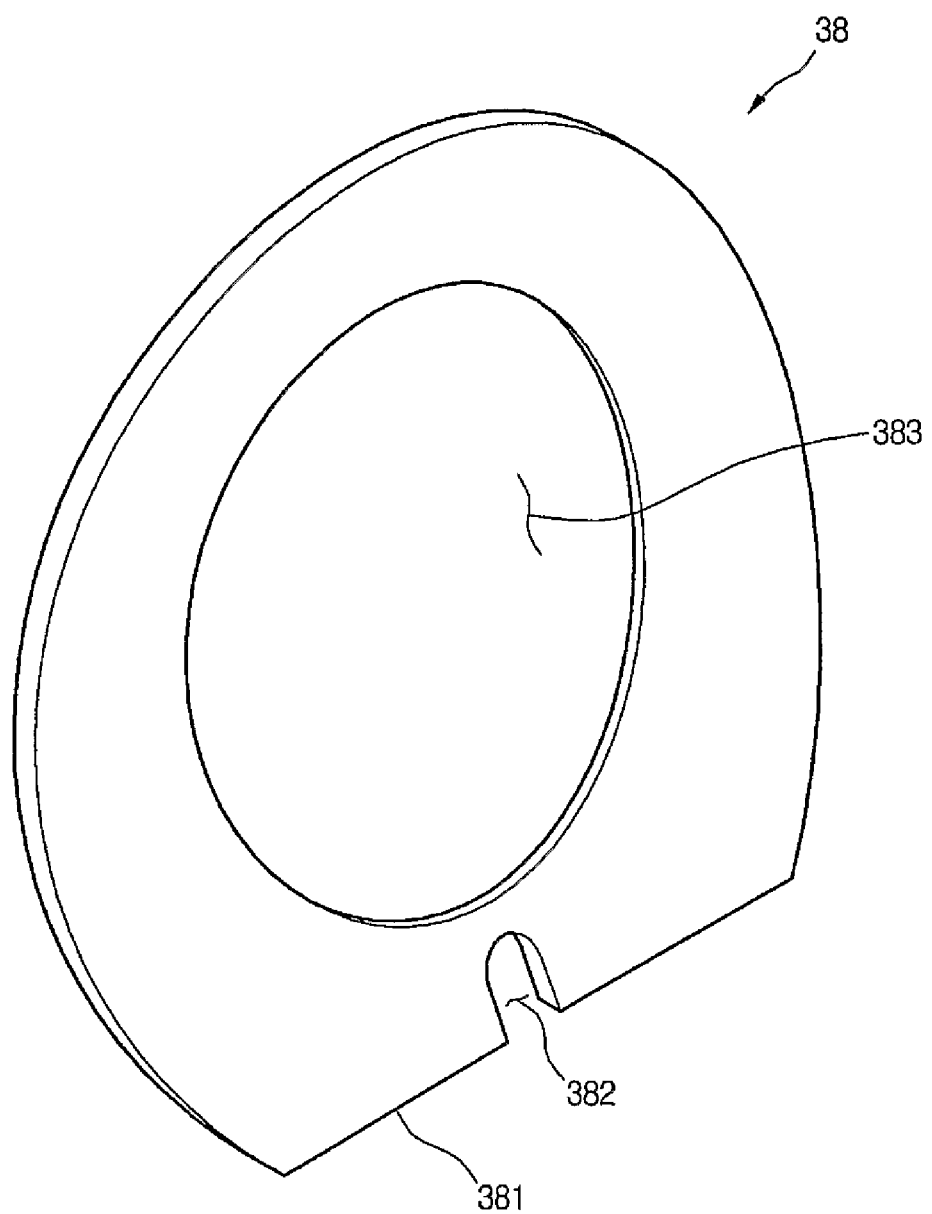
[Fig. 14]

IMAGE DISPLAY APPARATUS

TECHNICAL FIELD

The present invention relates to an image display apparatus, and more particularly, to an image display apparatus that can improve an installing stabilization and a space efficiency and can be formed to be slim by improving a structure of a supporting device for supporting a display device.

BACKGROUND ART

Generally, an image display apparatus includes a display device for displaying an image and a supporting device for supporting the display device. The display device may be a monitor or a television. The supporting device includes a stand standing on a supporting surface and coupled to a rear surface of the display device and a base horizontally coupled to a lower end of the stand.

That is, the display device is pivotally coupled to a top of the stand by a hinge. To prevent the display device from falling down due to moment generated by the load, the base has a relatively wide area.

In the above-described image display apparatus, since the display device, the stand and the base are provided as separated units, the number of parts increases and the space efficiency of a place where the display apparatus will be installed is not good.

Due to the large number of parts, it is difficult to assemble the display apparatus and thus the manufacturing cost increases.

Furthermore, since the parts cannot be properly disposed in the display device, a thickness of the display device increases, thereby deteriorating the quality of the flat display device.

In addition, since the hinge provided between the display device and the supporting device is too long, the volume taken by the display device increases, thereby deteriorating the space efficiency.

DISCLOSURE OF INVENTION

Technical Problem

An object of the present invention is to provide an image display apparatus that substantially obviates one or more problems due to limitations and disadvantages of the related art.

An object of the present invention is to provide an image display apparatus in which a display supporting device is simplified and which can prevent the display device from falling down and reduce an overall volume to improve the space efficiency.

Another object of the present invention is to provide an image display apparatus that can be manufactured by the relatively small number of parts, thereby reducing the manufacturing cost Still another object of the present invention is to provide an image display apparatus that can reduce a thickness of a flat display panel by properly disposing internal parts of a display device.

Still yet another object of the present invention is to provide an image display apparatus that is reduced in a size by compactly mounting a hinge between a display device and a supporting device, thereby improving the space efficiency and satisfying a user.

Still yet another object of the present invention is to provide an image display apparatus that has a simple, inexpensive stand by improving the structure of a hinge provided between a display device and a supporting device, thereby reducing the overall size of the display apparatus.

Technical Solution

To achieve these objects and other advantages and in accordance with the purpose of the invention, as embodied and broadly described herein, there is provided An image display apparatus including: a display for outputting an image; a supporting device supporting the display, the supporting device contacting directly on an installing surface and extending upward, the supporting device being provided with an inner hollow portion; and a light emission unit emitting light reflecting from the inner hollow portion.

In another aspect of the present invention, there is provided an image display apparatus including: a display module for outputting an image; a supporting device having a through hole having a predetermined diameter and inclined in front-rear direction; and a plurality of light emission devices for emitting light rearward through the through hole.

In still another aspect of the present invention, there is provided an image display apparatus including: a display; a supporting device for supporting the display, the supporting device having a front-lower end disposed in rear of a lower end of the display; and a light emission unit provided on the supporting device to turn on and off according to an operational state of the display.

According to still yet another aspect of the present invention, there is provided an image display apparatus including: a display module; and a supporting device supporting rotatably the display module and provided with a hole having a predetermined diameter, wherein a thickness of the supporting device is gradually reduced as it goes upward so that the user can easily grasp thereof.

In still yet another aspect of the present invention, there is provided an image display apparatus including: a display module; and a supporting device supporting rotatably the display module and provided with a hole having a predetermined diameter, a color of at least a portion of an inner surface of the hole being different from other portions.

Advantageous Effects

According to the present invention, since the apparatus is thin, a variety of desires of the consumers for the flat display can be satisfied.

That is, the structure of the display device is simple, the falling down of the display apparatus can be prevented, and the volume of the apparatus is reduced to improve the space efficiency.

In addition, since the number of parts used for the display apparatus is reduced, the manufacturing process is simple and the manufacturing cost is reduced. In addition, the apparatus can be easily installed.

In addition, since the arrangement of the part of the display module can be optimized, the thickness of the flat display can be reduced to improve the emotional satisfaction of the user.

Furthermore, since the hinge between the display and the supporting device is relatively small, a front-rear length of the image display apparatus is reduced to improve the space efficiency.

Since the hinge between the display and the supporting device is simple, the manufacturing cost of the supporting device can be reduced and the overall size of the display can be reduced.

In addition, since the light emission device is provided o the supporting device supporting the display, the user can easily identify if the display is in a power saving mode in a state where the display is turned off.

Furthermore, the light emission device allows the user can easily manipulate the keyboard even in a dark place.

Since the power consumption for driving the light emission device is lower than that for the conventional saving mode of the display, the overall power consumption can be reduced.

Since the display is automatically turned on and off when the user's hand approaches within a predetermined distance from the supporting device, no separate on/off button is required. Therefore, the outer appearance of the display can be improved. Since the light emission device is also turned on and off in response to the on/off operation of the display, the user can clearly identify the on/off state of the display.

BRIEF DESCRIPTION OF THE DRAWINGS

FIG. 1 is a perspective view of an image display apparatus according to an embodiment of the present invention;

FIG. 2 is an exploded perspective view of the image display apparatus of FIG. 1;

FIG. 3 is a rear perspective view of a printed circuit board (PCB) bracket of a display depicted in FIG. 1;

FIG. 4 is a rear perspective view of a main frame of the display depicted in FIG. 1;

FIG. 5 is a rear perspective view of a rear cabinet of the display depicted in FIG. 1;

FIG. 6 is a rear perspective view of a rotational member of the display depicted in FIG. 1;

FIG. 7 is an exploded perspective view of the rotational member of FIG. 6;

FIG. 8 is an exploded perspective view of a supporting device depicted in FIG. 1;

FIG. 9 is a longitudinal sectional view of the supporting device of FIG. 8;

FIG. 10 is a rear perspective view of a front cover of the supporting device of FIG. 9;

FIG. 11 is a perspective view of a weight balance of the supporting device of FIG. 8;

FIG. 12 is a perspective view of a supporting member of the supporting device of FIG. 8;

FIG. 13 is an exploded perspective view of a light emission unit of the supporting device of FIG. 8; and FIG. 14 is a rear perspective view of a back cover of the supporting device of FIG. 8.

BEST MODE FOR CARRYING OUT THE INVENTION

Reference will now be made in detail to the preferred embodiments of the present invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

FIG. 1 is a perspective view of an image display apparatus according to an embodiment of the present invention and FIG. 2 is an exploded perspective view of the image display apparatus of FIG. 1.

Referring to FIGS. 1 and 2, an image display apparatus 1 according to the present invention includes a display 10 for displaying an image, a supporting device 30 for supporting the display 10, a signal cable 29 for transmitting an image signal to the display 10, and a coupling member 50 coupled to an end portion of the signal cable 29. A power cable and signal cable extending from a main body such as a computer are coupled to the coupling member 50.

That is, the display 10 includes a display module 12 displaying an image, a front frame 11 disposed around a front edge of the display module 12, a main frame 16 coupled to a rear surface of the display module 12 to protect the display module 12, an inverter coupled to a front surface of the main frame 16 to supply electric power to the display module by inverting a direct current into an alternating current and boosting and outputting the voltage, and a main control unit 14 for controlling the drive of the inverter 15 and the transmitting and receiving of the image signal.

As the display module, an LCD, PEP or OLED that can display an image may be used.

The display 10 includes a bracket 13 coupled to the front surface of the main frame 16 and a rear cabinet 17 disposed in rear of the main frame 16 and coupled to the front frame 11. A variety of parts including the inverter 15 and the main control unit 14 are mounted on and protected by the bracket 13.

Meanwhile, a rotational member 60 is coupled to the rear surface of the main frame 16. The rotational member penetrates at least partly the rear cabinet 17 and is coupled to the supporting device 30.

In the above-described display 10, the internal parts mounted in the display 10 are concentrated on a central portion of the main frame 16 to make the display 10 slim. That is, an edge portion of the display can be thinner that that of the conventional display device. Namely, since the internal parts mounted in the display 10 are supported on the central portion of the main frame 16, a thickness of the central portion of the display 10 is greater than the edge portion of the display 10. Therefore, the user feels as if the edge portion of the display 10 is thinner than its real thickness.

When the internal parts are disposed as described above, since the edge portion of the rear cabinet 17 is thinner than the central portion of the rear cabinet 17 when viewed from a side, the user's satisfaction can be improved. Furthermore, since the rear cabinet 17 has a central portion thicker than an edge portion, the user's satisfaction can be more improved. In addition, since the rear cabinet 17 is formed of a single plate without any parting line or hole, the user cannot feel the thickness different to its outer appearance. In addition, since a cover for coupling the rotational member or a heat dissipation hole can be eliminated from the rear cabinet 17, the surface of the rear cabinet 17 can be smoothly formed.

The coupling member 50 includes a cable terminal in which the power cable will be inserted and a signal terminal in which a cable extending from the main body such as the computer will be inserted.

Major parts of the display 10 will now be described in more detail with reference to the accompanying drawings.

FIG. 3 is a rear perspective view of the bracket of the display.

Referring to FIG. 3, the bracket 13 is disposed in front of the main frame 16 and the inverter 15 and the main control unit 14 are coupled in rear of the bracket 13.

The bracket 13 is provided with a plurality of fixing hooks 131, an inverter fixing rib 132 disposed near the fixing hooks 131 to fix the inverter 15, a plurality of main control unit coupling hooks 133, and a main control unit fixing rib 134 formed near the main control unit coupling hook 133 to fix the main control unit 14.

A plurality of coupling bosses 135 protrude from a rear surface of the bracket 13. A coupling member penetrating the main frame 16 is formed on the coupling boss 135. Other parts in addition to the inverter 15 and the main control unit 14 may be mounted inside the bracket 13. That is, it is a feature of the present invention that, since the parts are concentrically mounted on the bracket 13, the thickness of the display 10 is minimized at the edge portion of the display 10. To achieve this, the bracket 13 is mounted on the central portion of the main frame 16.

In addition, the bracket 13 is formed of a metal material to quickly dissipate heat, thereby preventing the display module 12 from being damaged by the heat emitted from the parts such as the main control unit 14 and the inverter 15. Needless to say, it is preferable that all of the parts are mounted on the bracket 13.

FIG. 4 is a rear perspective view of the main frame.

Referring to FIG. 4, the main frame 16 is disposed in front of the rear cabinet 17. Like the bracket 13, the main frame is formed of a metal material to quickly dissipate the heat, thereby preventing the display module 12 or other parts from being damaged by the heat emitted from the parts.

That is, in the conventional display, a variety of parts such as the inverter, PCB and the like stud the display module. Therefore, the thickness of the edge portion of the display increases by the thickness of the studded part. However, in the display according to the present invention, since the variety of parts are concentrically arranged on the central portion of the display module 12, the edge portion of the display is relatively thin.

Meanwhile, a rotational member coupling portion 163 is formed on an approximately central portion of the rear surface of the main frame 16. That is, the rotational member coupling portion 163 includes a hook rib 164 on which an edge portion of a display supporting portion (61 of FIG. 6) of the rotational member 60 is hooked, a fixing rib 165 for fixing the side edge portion of the rotational member 60, a shaft insertion hole 167 in which a shaft (62 of FIG. 6) of the rotational member 60 is inserted, and a coupling hole 166 in which the coupling member penetrating the display supporting portion 61 is inserted.

The hook rib 164 protrudes rearward and is bent so that the upper edge portion of the display supporting portion 61 can be hooked thereon. The coupling hole 166 is formed at locations where coupling members penetrating four corners of the display supporting portion 61.

The rotational member coupling portion 163 may be formed near a central portion and lower edge portion of the main frame 16. Therefore, a height of the display 10 is determined according to a position where the rotational member 60 is mounted. That is, the fixing position of the rotational member 60 can be selected by a user or a manufacturer. The rotational member coupling portion 163 is not limited to the above-described structure. That is, the rotational member coupling portion 163 can be formed in a variety of structures.

However, a main concept of the present invention is in that the rotational member 60 is coupled to the main frame 16 supporting the display module and the rotational member coupling portions 163 can be formed at a plurality of locations. FIG. 4 shows that the rotational member 60 is fixed near a lower edge portion of the main frame 16.

FIG. 5 is a rear perspective view of the rear cabinet of the display according to the present invention.

Referring to FIG. 5, the rear cabinet 17 of the present invention defines a rear surface of the display 10. Unlike the conventional rear cabinets, the rear cabinet of the present invention is formed through an injection molding process to have a smooth overall surface.

According to the conventional display, a variety of holes or grooves such as heat dissipation holes for dissipating the heat generated from the display module and the PCB, cover holes for coupling the cover covering the rotational member, or cable grooves for coupling the power cable are scattered and formed. Furthermore, since the rear surface of the rear cabinet is formed not to have a smooth surface but many steps, a thickness of the display increases and the outer appearance of the rear portion is deteriorated. Furthermore, the stepped rear surface makes it difficult to perform the assembling process in the assembling lines.

However, no heat dissipation hole, cover or cable groove is formed on the rear cabinet 17 according to the present invention to provide a smooth surface. Furthermore, since no additional part such as the cover member is coupled thereto, a coupling line (parting line) between the coupled part and the rear cabinet 17 can be eliminated. Therefore, the outer appearance of the rear cabinet 17 can be improved.

That is, the rear cabinet 17 according to the present invention is not provided with any protrusions or holes but only a penetration sleeve 171 in which the rotational member 60 inserted. The penetration sleeve 171 protrudes rearward by a predetermined length from a central portion or a lower end of the rear cabinet 17 according to the production specification. That is, the rotational member coupling portion 163 formed on the rear surface of the main frame 16 may be formed the central portion and lower end of the main frame 16. Therefore, the forming position of the penetration sleeve 171 may be compatible with other rear cabinets 17.

Meanwhile, The rear cabinet 17 protrudes rearward as it goes from the edge portion to the central portion. That is, in order to prevent interference with a part seating portion 161 protruding inward of the main frame 16, the central portion of the rear cabinet 17 protrudes by a predetermined height higher than that of the edge portion.

However, since the surface of the rear cabinet 17 is smoothly formed without any parting lines, hole or steps, the user cannot easily feel the protrusion of the central portion of the rear cabinet 17. That is, the overall thickness of the display 10 is felt to be same as the thickness of the edge portion of the display 10, thereby improving the user satisfaction.

That is, the penetration sleeve 171 extends rearward from the rear-lower portion of the rear cabinet 17 and is provided with a hollow portion. The rotational member 60 mounted on the rear surface of the main frame 16 penetrates the hollow portion and is coupled to the supporting device 30. Here, the hollow portion is formed to have a size preventing the display 10 pivoting in a vertical direction from interfering with the penetration sleeve 171. The penetration sleeve 171 can be formed to have a cross-section formed in a variety of shapes such as a circular shape, a polygonal shape and the like. The penetration sleeve 171 is integrally formed with the rear cabinet 17. As shown in the drawing, the penetration sleeve 171 protrudes from the rear surface of the rear cabinet 17 and is gently curved from the rear surface of the rear cabinet 17 to improve the outer appearance. If required, a lower portion of the penetration sleeve 171, which is not observed by naked eyes of the user, may be omitted.

Since no additional part except for the penetration sleeve 171 extending at a gentle curve is coupled to the rear cabinet 17 and no step is formed on the rear surface of the rear cabinet 17, it can be easily manufacture through the injection molding process, thereby simplifying the manufacturing process.

Furthermore, in the image display apparatus 1 according to the present invention, since the rotational member 60 is coupled to the main frame 16, the rear cabinet 17 does not require a cover member for covering the rotational member 60. Therefore, the outer appearance of the rear cabinet 17 is smooth. In addition, since the penetration sleeve 171 is inserted or aligned in the supporting device 30, it cannot be observed from an external side. Furthermore, since there is no sharp corner or point, the supporting device 30 does not involve any risk for the user handling the same.

FIG. 6 is a rear perspective view of a rotational member mounted on the display and FIG. 7 is an exploded perspective view of the rotational member of FIG. 6.

Referring to FIGS. 6 and 7, the rotational member mounted on the display 10 according to the present invention has first and second ends coupled respectively to the main frame 16 and the supporting device 30, respectively.

That is, the rotational member 60 includes the display supporting portion 61 attached to the rear surface of the main frame 16, the shaft 62 extending rearward from the rear surface of the display supporting portion 61, the hinge 63 crossing the shaft 62 at an end of the shaft 62, washers 66 and tightening nuts 65 inserted in the hinge 63, and fixing members 64 fitted between the washers 66 and fixedly coupled to the supporting device 30.

The shaft 62 may be integrally formed with the display supporting portion 61 or fixedly fitted on the rear surface of the display supporting portion 61. When the shaft 62 is fitted on the display supporting device 61 as a separate unit, there is a need to prevent the idling of the display supporting portion 61 around the shaft 62. Therefore, in order to prevent the idling, one side portion of the outer circumference of the shaft 62 coupled to the supporting portion 61 is cut away as shown in FIGS. 6 and 7. When the shaft 62 is formed in a cylindrical shape without the cut-away portion, it is tightly inserted in a boss 612 so that it can be supported by frictional force. Therefore, the display 10 rotates about its axis to realize the portrait mode.

In addition, the binge 63 coupled to the shaft 62 in a crossing direction is integrally formed with the shaft 62 to rotate together with the shaft 62. Alternatively, the hinge 63 may be fitted to the shaft 62 so that only the shaft 62 can rotate. Preferably, the hinge 63 may be integrally formed with the shaft 62 to rotate together.

That is, in order to prevent the hinge 63 and the shaft 62 from rotating together and to prevent the display 10 from inadvertently rotating by gravity, the washers 66 are fitted around the hinge 63. In order to allow the tightening nuts 65 to be tightened on the outer circumference of the end portion of the hinge 63, a thread is formed on the outer circumference of the end portion of the hinge 63. That is, in order to prevent the hinge 63 from inadvertently rotating by the load of the display 10, at least a portion of the hinge 63 has an outer circumference cut by a D-cut process and at least one washer 66 is fitted around the hinge 63. The washer 66 may be a normal washer or a spring washer. At least one of the washers 66 fitted around the hinge 63 has a hole formed in a shape identical to a cross-section of the hinge 63 cut by the D-cut process so that the washer 66 can rotate together with the hinge 63. Another washer is further fitted around the hinge 63 in front and rear of the washer 66 having the hole formed in the shape identical to the cross-section of the hinge 63 cut by the D-cut process. As the hinge 63 rotates by the above described assembling structure, frictional force is generated between the washers, thereby preventing the display 10 from falling down by its gravity and making it possible to adjust the display at a desired inclination.

In addition, the fixing member 64 is bent at a portion to be divided into two sections with reference to the bent portion. One of the two sections of the fixing member 64 is fitted around the hinge 63 and the other is coupled to the supporting device 30. A plurality of coupling holes are formed on the section coupled to the supporting device 30 so that the coupling members can be inserted through the coupling holes. The assembly of the fixing member 64 and the supporting device 30 will now be described in more detail with reference to the accompanying drawings.

The washers 66 are inserted around the hinge 63 in front and rear of the section fitted around the hinge 63 to prevent the fixing member 64 from directly contacting the shaft 62, thereby preventing the abrasion of the fixing member 64 and the shaft 62. By properly adjusting the tightening degree of the tightening nut 65, the display 10 can smoothly rotate without falling down by its load.

At least one of the washers 66 is provided with a rotation restriction portion 68 to prevent the display supporting portion 61 from rotating over a predetermined angle. That is, when the display supporting portion 61 rotates by the predetermined angle, the rotation restriction portion 68 contacts the fixing member 64 to prevent the display supporting portion 61 from further rotating. Therefore, when the display device excessively rotates downward, the rotation restriction portion 68 prevents the display device from being damage.

In addition, a coupling hole 611 is formed on a corner portion of the display supporting portion 61 so that a coupling member is inserted through the coupling hole 611. The coupling member inserted through the coupling hole 611 is further inserted through the coupling hole 166 of the main frame 16 so that the rotational member 60 can be fixed on the rear surface of the main frame 16.

As described above, the rotational member 60 according to the present invention has a first end fixed to the main frame 16 and a second end coupled to a supporting member constructing portion of the supporting device. In this state, the main frame 16 can rotate relative to the supporting member. Therefore, a distance between the main frame 16 and the supporting member can be reduced and a distance between the display device and the supporting device is also reduced. As a result, by the structure of the rotational member and the mounting structure of the rotational member, the display device can be more compact, thereby more reliably preventing the display 10 from falling down. Needless to say, the structure of the hinge is simplified, thereby reducing the manufacturing costs and improving the convenience of the manufacturing process.

FIG. 8 is an exploded perspective view of the supporting device and FIG. 9 is a longitudinal sectional view of the supporting device.

Referring to FIGS. 8 and 9, unlike the conventional supporting device, the supporting device 30 supporting the display 10 does not require a separate base member. That is, the supporting device 30 is formed in a single unit that directly contacts the floor surface, thereby reducing the manufacturing costs, simplifying the assembling process and improving the installation efficiency.

The supporting device 30 includes a front cover 31 provided with a hole having a predetermined diameter, a back cover 38 coupled to a rear portion of the front cover 31, a weight balance 32 disposed between the front cover 31 and the back cover 38 to prevent the display from falling down, a supporting member coupled to the weight balance 32 to support the rotational member 60, a light emission unit 39 disposed in rear of the supporting member 34 to emit light, and a top cover 33 coupled to an upper portion of the front cover 31.

By the above-described coupling structure, the weight balance 32 compensates for the moment generated by the gravity of the load of the display 10, thereby preventing the display 10 from falling down frontward.

The front cover 31 and the back cover 38 are provided with holes through which the user observes a rear portion of the image display apparatus 1.

Light emission devices such as light emitting diodes (LED) may be attached on the light emission unit 39. The light emitted from the light emission devices is directed to the user's eyes. An on/off interval and on/off time of the light emission devices can be automatically controlled by the control unit. For example, the on/off of the light emission devices can be controlled according to whether the display is turned on or off. Alternatively, the light emission devices can be controlled such that it is automatically turned off when the display 10 is switched from a normal mode to a power saving mode.

The structures and functions of the parts of the supporting device will now be described in more detail with reference to the accompanying drawings.

FIG. 10 is a rear perspective view of the front cover.

Referring to FIG. 10, the front cover 31 of the supporting device 30 includes a front portion 311 formed in a ring shape having a predetermined diameter, an outer sleeve 312 extending rearward from an outer circumference of the front portion 311, and an inner sleeve 313 extending rearward from an inner circumference of the front portion 311.

A bottom portion 317 is formed on a lower end of the front cover 31. In order to stably install the image display apparatus 1 on the installing surface, a lower end of the front cover 31 is formed to be flat having a predetermined width. That is, the bottom of the outer sleeve 312 is formed to be flat extending from the lower end of the front portion 311 to prevent the display 10 from falling down sideward.

The outer sleeve 312 and the inner sleeve 313 are spaced apart from each other by a predetermined interval. The weight balance 32 is inserted in the space defined between the outer and inner sleeves 312 and 313 to compensate the moment generated by the load of the display 10.

Stepped portions 318 are formed on rear ends of the outer and inner sleeves 312 and 313 so that the back cover 38 can be securely coupled thereto. A cut-away portion 315 through which the rotational member 60 passes is formed on an upper portion of the front portion 311. The top opening of the cut-away portion 315 is closed by a top cover 33. That is, an edge portion near the cut-away portion 315 is provided with a top cover seating portion 316 on which the top cover 33 seats. A plurality of coupling bosses 319 are formed on the front portion 311 at both sides of the cut-away portion 315. Coupling members are inserted in the coupling bosses 319 so that the supporting member 34 is coupled to the rear surface of the front cover 31.

The inner sleeve 313 is inclined at it goes rearward. That is, as shown in FIG. 9, a lower end section of the inner sleeve 313 is inclined upward as it goes rearward. Therefore, the light emitted from the light emission unit 39 mounted to the back cover 38 is reflected from an inner circumference of the inner sleeve 313. Furthermore, brightness of the light reflected from the inner circumference of the inner sleeve 313 is gradually weakened as it goes from a rear end of the inner sleeve 313 to a front end of the inner sleeve 313. Therefore, the supporting device 30 is viewed from a front side, thereby providing a feeling similar to the lunar or solar eclipse. Therefore, the supporting device 30 looks luxurious and mysterious.

In order to effectively reflect the light emitted from the light emission unit 39 on the inner circumference of the inner sleeve 313, the inner circumference of the inner sleeve 313 may be super-polished or coated with a color identical to that of the light emitted from the light emission unit 39. For example, when the light emission unit emits red light, the inner circumference of the inner sleeve 313 is coasted with the red color.

In addition, a color of the inner circumference of the inner sleeve 313 may be different from that of other portion so that the light reflected from the inner circumference of the inner sleeve 313 contrasts with the color of the image display apparatus 1. Therefore, the outer appearance of the image display apparatus 1 can be improved.

The light emission unit 39 may be designed to be automatically turned on and off when the user's hand is inserted into a hollow portion 314 of the inner sleeve 313 or approaches within a distance from the hollow portion 314. This will be described in more detail with reference to the drawing later.

An anti-sliding member may be attached on an outer bottom surface of the bottom portion 317 of the supporting device 30 to prevent the image display apparatus 1 from sliding when the installing surface of the image display apparatus 1 is inclined at a predetermined angle. The anti-sliding member may be formed of a material having predetermined frictional force such as rubber or fabric such as velcro-tape having a predetermined friction.

FIG. 11 is a perspective view of the weight balance.

Referring to FIG. 11, That is, in order to compensate for the moment generated by the load of the display 10, the weight balance 32 is formed to have a predetermined weight or more. Therefore, the weight balance 32 may be formed of a material such as cast iron.

The weight balance 32 includes a balance body 321 and an inner sleeve contacting end 322 extending an upper-center portion of the balance body 321.

A bottom portion of the balance body 321 is flat to be identical to that of the bottom portion 317 of the front cover 31 and curved with a predetermined curvature from an edge portion of the flat portion. That is, the balance body 321 is curved with a curvature identical to that of the outer sleeve 312 of the front cover 31. Referring to FIG. 11, a signal cable receiving groove 326 for receiving a signal cable 39a is formed on a rear-center portion of the flat portion of the balance body 321.

The cable receiving groove 326 is provided with a coupling groove 325 for fixing the signal cable 39a to the weight balance 32 to prevent the signal cable 39a connected to the display 10 from being disconnected from the display 10 by outer force or by a spacing apart from a main body such as the computer. That is, since the signal cable 39a is fixed on the weight balance 32, the signal cable 39a is not separated from the display 10 even when outer force is applied thereto.

In addition, the inner sleeve contacting end 322 is curved with a curvature identical to that of the inner sleeve 313 so that the inner sleeve 313 can be supported by the inner sleeve contacting end 322. Supporting member contacting portions 323 to which the supporting member 34 is coupled are formed at both sides of the inner sleeve contacting end 322. A plurality of coupling holes 324 are formed on the supporting member contacting portions 323. The coupling members inserted in the coupling holes 324 fix the supporting member 34 on the weight balance 32.

FIG. 12 is a perspective view of the supporting member of the supporting device.

Referring to FIG. 12, the supporting member 34 of the supporting device 30 is disposed in rear of the front cover 31 and curved with a curvature almost identical that of the front cover 31.

The rotational member 60 is coupled to the front surface of the supporting member 34 and the supporting member 34 is coupled to the weight balance 32. Therefore, the load of the display is transmitted to the weight balance 32 via the rotational member 60, thereby preventing the display 10 from falling down due to the moment generated by the load thereof.

The supporting member 34 is formed in an arc-shape and includes a load transmission portion 341 formed of metal, a horizontal bent portion 342 bent rearward from opposite ends of the load transmission portion 341, a coupling end 343 bent downward from an end of the horizontal bent portion 342.

A rotational member coupling surface 345 to which the rotational member 60 is coupled is formed on the center of the load transmission portion 341. Front cover coupling holes 347 are formed at portions spaced apart from both sides of the rotational member coupling surface 345. Therefore, coupling members penetrating the front cover coupling holes 347 are inserted in the coupling bosses 319 formed on an edge portion of the cut-away portion 315 of the front cover 31. Coupling ends 348 extend from portions spaced apart from both sides of the front cover coupling holes 347 and the light emission unit 39 is coupled to the coupling ends 348.

The load transmission portion 341 is provided with reinforcing grooves 349. That is, when the load of the display is transmitted, the supporting member 34 may be formed of metal having a predetermined rigidity so that it is not deformed or broken when the load of the display 10 is transmitted. Furthermore, the reinforcing grooves 349 further prevents the load transmission portion 341 from being bent or broken by the load of the display 10. The supporting member 34 is not limited to the arc-shape. Any shape that can effectively transmit the load of the display 10 to the weight balance 32 will be possible.

The horizontal bent portion 342 seats on the top surface of the sleeve contacting end 322. The coupling end 343 contacts closely the supporting member contacting portion 323 of the inner sleeve contacting end 322. The coupling end 343 is provided with a plurality of coupling holes 344 corresponding to the coupling holes 324 formed on the supporting member contacting portion 323. That is, since the coupling member penetrates the coupling holes 324 and 344, the supporting member 34 can be stably coupled to the weight balance 32.

The supporting member 34 surrounds the inner sleeve 313 formed in the front cover 31. As the coupling member penetrating the front cover coupling hole 347 is inserted in the coupling boss 319, the supporting member 34, the front cover 31 and the weight balance 32 are coupled together. Therefore, the moment transmitted to the supporting member 34 is dispersed to the front cover 31 and the weight balance 32.

FIG. 13 is an exploded perspective view of the light emission unit of the supporting device.

Referring to FIG. 13, the light emission unit 39 emitting the light having a specific wavelength is mounted on the supporting device 30.

The light emission unit 39 includes a light emission plate 36 on which a plurality of light emission devices 361 are arranged in series, a light transmission lens 37 disposed in rear of the light emission plate 36, a fixing bracket 35 disposed in front of the light emission plate 36.

The light emission unit 39 is disposed in rear of the supporting device 30 and mounted on an edge portion of the through hole formed through the supporting device 30. Therefore, the light emitted from the light emission unit 39 is reflected forward of the supporting device 30 through the through hole.

The light emission plate 36 is disposed on a rear surface of the fixing bracket 35. That is, the light emission plate 36 includes a plurality of PCBs electrically connected to each other by a connecting line 364. Therefore, the light emission plate 36 cannot maintain its shape by itself. Thus, the PCBs are fixed on the fixing bracket so that the overall shape of the light emission plate 36 can be maintained.

The fixing bracket 35 includes a plate seating surface 351, a separation preventing rib 352 protruding along an outer circumference of the plate seating surface 351, a shaking preventing projections 354 protruding from the plate seating surface 351, hook holes 355 formed on the plate seating surface 351, a coupling end 353 protruding from the outer circumference of the plate seating surface 351.

The light emission devices 361 are arranged on a rear surface of the light emission plate 36 and spaced apart from each other by a predetermined distance. A plurality of projection holes 362 are formed through the rear surface of the light emission plate 36. A control unit 365 is mounted on a portion of an edge portion of the light emission plate 36 to receive the light emission device control signal from the main control unit 14 of the display 10. By the control signal, the light emission devices 361 are simultaneously or sequentially turned on and off. The light emission plate 36 is provided with a plurality of hook holes 363. That is, the light emission devices 361 emit light having a specific wavelength. The light emission device 361 may be an LED. However, the present invention is not limited to this. Other types of the light emission devices can be applied to the present invention.

The light transmission lens 37 is mounted on an inner edge of the through hole of the back cover 37. The light transmission lens 37 is provided with a plurality of coupling ends 371 extending from an edge portion. The fixing bracket 35 and/or the back cover 38 is coupled to the coupling ends 371.

The shaking preventing projections 354 protruding from the fixing bracket 35 are inserted in the projection holes 362 formed on the light emission plate 36. Therefore, when the PCBs of the light emission plate are mounted on the fixing bracket 35, the PCBs are not shaken or separated from the seating portions thereof.

A plurality of hook members protrudes from the front surface of the back cover 38. The hook members are fitted in the hook holes 355 and 363 formed on the fixing bracket 35 and the light emission plate 36.

By the separation preventing rib 352 formed on the outer circumference of the fixing bracket 35, the sliding separation of the light emission plate 36 from the plate seating portion 351 of the fixing bracket 35 can be prevented.

The light emission unit 39 turns simultaneously or sequentially on and of the light emission devices according to the on/off state of the display 10 and the operation of the display. For example, the moment the display 10 is turned on, the light emission devices 361 can be simultaneously or sequentially turned on clockwise or counterclockwise.

Alternatively, when the user's hand is inserted through the through hole of the supporting device 30 or approaches within a distance from the supporting device 30, the light emission devices 361 can be automatically turned on and off.

In this case, a sensor is mounted on the inner circumference of the inner sleeve 313 to detect the approach of the user's hand.

FIG. 14 is a rear perspective view of the back cover of the supporting device.

Referring to FIG. 14, the back cover 38 of the supporting device 30 of the present invention is provided with a through hole 383 having a predetermined diameter, a bottom surface 381 horizontally cut at a lower portion and a through hole 382 concaved at a central portion of the bottom surface for a signal cable penetrating therethrough.

The back cover 38 is provided at a front surface with a plurality of hook members inserted in the hook holes formed on the light emission unit 39. The back cover 38 is provided at an upper-front surface with a hook coupled to the top cover 33. The top cover 33 is provided at a rear end with an insertion hole in which the hook is inserted. That is can be identified from the sectional view of FIG. 9.

The supporting device 30 has front and rear surfaces inclined such that, when viewed from the side, a thickness of the upper end portion is minimized and a thickness of the lower end portion is maximized. The user grasps the upper portion of the supporting device 30 to easily carry the supporting device 30. That is, the user's palm contacts closely an outer circumference of the supporting device at the minimized thickness portion and fingers is inserted in the inner sleeve 313 so as to safely grasp the supporting device 30.

INDUSTRIAL APPLICABILITY

According to the present invention, the image display apparatus can be formed in a simple structure and prevented from falling down while reducing the overall volume thereof to improve the space efficiency, thereby satisfying a variety of consumer's wants. Therefore, the present invention is very likely to be applied to the industrial field.

The invention claimed is:

1. An image display apparatus, comprising:
    a display, including:
        a display module for outputting an image;
        a front frame disposed in front of the display module to protect an edge portion of the display module;
        a main frame disposed at a rear of the display module to support and protect the display module;
        a plurality of circuits fixed on the main frame to drive the display module; and
        a rear cabinet for protecting a rear surface of the display module;
    a supporting device that supports the display, the supporting device having a bottom surface, the bottom surface being configured to directly a surface on which the image display apparatus is installed, the supporting device having a hollow portion; and
    a light emission unit installed around the hollow portion of the supporting device, wherein the hollow portion extends through the supporting device in a front to rear direction such that light emitted by the light emission unit is reflected from a rear portion towards a front portion of the hollow portion, wherein the light emission unit comprises:
        a light emission plate;
        a plurality of light emission devices mounted on the light emission plate;
        a light transmission lens for transmitting the light emitted by the plurality of light emission devices;
        a controller that controls operation of the plurality of light emission devices; and
        a fixing bracket on which the light emission plate is seated, wherein the plurality of light emission devices are arranged in series along the light transmission lens, and wherein the controller turns the plurality of light emission devices simultaneously or sequentially on and off based on at least one of an on/off state of the display, an operation state of the display including a normal mode and a power saving mode, or detection of a user extremity within a predetermined distance.

2. The image display apparatus according to claim 1, wherein a lower portion of the hollow portion is inclined upward as it goes rearward.

3. The image display apparatus according to claim 1, wherein the plurality of light emission devices emit light having a specific wavelength, and wherein the light transmission lens is transparent or semi-transparent.

4. The image display apparatus according to claim 1, wherein the controller turns the plurality of light emission devices simultaneously or sequentially on and off in response to detection of a user's hand within a predetermined distance.

5. The image display apparatus according to claim 1, wherein the light emission unit includes an LED (Light Emitting Diode).

6. The image display apparatus according to claim 1, wherein the supporting device includes:
    a front cover having the hollow portion;
    a back cover coupled to a rear of the front cover, the back cover having an opening which has a diameter corresponding to a rear end of the hollow portion; and
    a weight balance installed in a space defined by the front cover and the back cover, wherein the weight balance has a predetermined weight to prevent the display from falling down due to momentum generated by a weight of the display.

7. The image display apparatus according to claim 6, further comprising:
    a rotational member attached on the display to adjust an angle of the display; and
    a supporting member to which the rotational member is coupled, the supporting member being fixed to the weight balance to disperse a load of the display that is transmitted to the rotational member.

8. The image display apparatus according to claim 7, wherein the rotational member includes:
    a supporting portion for supporting the display;
    a shaft extending from a rear surface of the supporting portion;
    a hinge extending in a direction crossing the shaft; and
    a fixing portion fitted around the hinge.

9. The image display apparatus according to claim 8, wherein the fixing portion comprises a pair of fixing members fitted around the hinge on opposite sides of the shaft, and wherein the rotational member further includes:
    at least one tightening nut fitted around the hinge; and
    a plurality of washers provided between the pair of fixing members and the at least one tightening nut, wherein the at least one tightening nut provides a predetermined frictional force between the washers.

10. The image display apparatus according to claim 1, further comprising a rotational member configured to rotatably couple the display module to the supporting device, wherein the rear cabinet includes a hollow sleeve extending rearward to allow the rotational member to penetrate the rear cabinet.

11. The image display apparatus according to claim 10, wherein the main frame is provided with two or more rotational member coupling portions to which the rotational member is fixed so that the rotational member can be variably fixed on the main frame.

12. The image display apparatus according to claim 3, wherein an inner circumference of the hollow portion is super-polished or coated with a color identical to that of the light emitted from the light emission unit.

13. The image display apparatus according to claim 1, wherein a thickness of the supporting device is gradually reduced as it goes upward so as to provide a grasping surface.

14. The image display apparatus according to claim 1, further comprising an anti-sliding member attached on the bottom surface of the supporting device.

15. The image display apparatus according to claim 1, wherein the circuits are concentrated on a central portion of the main frame such that a thickness defined by the front frame and the rear cabinet at an edge portion is thinner than at the central portion.

16. The image display apparatus according to claim 1, wherein a rear surface of the rear cabinet is gently curved such that an edge portion of the rear cabinet is thinner than a center portion of the rear cabinet.

17. The image display according to claim 1, wherein at least a portion of an inner surface of the hollow portion is painted with a different color from that of other portions of the supporting device.

18. An image display apparatus, comprising:
a display;
a supporting device configured to support the display on a receiving surface;
a rotational coupling device that rotatably couples the display to the supporting device;
a light emission device provided at an inner periphery of a through hole formed in the supporting device, wherein the light emission device comprises:
a bracket;
a plate aligned with the bracket and coupled to a rear side of the bracket;
a plurality of light emission devices coupled to a rear side of the plate, aligned with a plurality of projection holes formed in the plate;
a light emission lens coupled to the rear side of the plate and to the inner periphery of the through hole formed in the supporting device; and
a controller that controls operation of the plurality of light emission devices; and
a motion sensor provided proximate the inner periphery of the through hole formed in the supporting device, wherein the controller turns the plurality of light emission devices simultaneously or sequentially on and off based on at least one of an on/off state of the display, an operation state of the display including a normal mode and a power saving mode, or detection of motion within a predetermined distance of the motion sensor.

19. The image display apparatus of claim 18, wherein the supporting device comprises:
a front cover having a first opening formed therein;
a back cover coupled to a rear of the front cover so as to form a receiving space therebetween, the back cover having a second opening formed therein corresponding to the first opening formed in the front cover, wherein the light emission device is installed in the receiving space; and
a weight balance installed in a lower portion of the receiving space.

20. The image display apparatus of claim 19, wherein inner peripheral surfaces of the first opening formed in the front cover and the second opening formed in the back cover define the through hole formed in the supporting device, and wherein light emitted by the plurality of light emission devices provided on the plate is emitted into the through hole formed in the supporting device by the light emission lens coupled to the inner periphery of the through hole formed in the supporting device.

21. The image display apparatus of claim 18, wherein the rotational coupling device comprises:
a supporting plate coupled to the display;
a shaft that extends rearward from a rear surface of the supporting plate;
a hinge coupled to a distal end of the shaft, opposite a proximal end thereof that is coupled to the supporting plate, in a direction crossing the shaft; and
at least one fixing bracket coupled to the hinge.

22. The image display apparatus of claim 21, wherein the at least one fixing bracket comprises a pair of fixing brackets fitted around opposite ends of the hinge positioned on opposite sides of the shaft, and wherein the rotational coupling device further comprises:
a pair of tightening nuts fitted around the opposite ends of the hinge; and
a plurality of washers respectively provided between the pair of fixing brackets and the pair of tightening nuts.

23. The image display apparatus of claim 22, wherein the display comprises:
a front frame;
a display module coupled to the front frame;
a rear cabinet coupled to a rear surface of the front frame and the display module so as to form an installation space therebetween;
a main frame installed in the installation space; and
a bracket coupled to the main frame, the bracket having a main controller coupled thereto.

24. The image display apparatus of claim 23, wherein the supporting plate of the rotational coupling device is coupled to a rear surface of the main frame, and the shaft extends through an opening formed in the back cabinet, and wherein the pair of fixing brackets are coupled to a supporting frame provided in the supporting device so as to rotatably couple the display to the supporting device.

* * * * *